(12) United States Patent  (10) Patent No.: US 8,085,400 B2
Sudo  (45) Date of Patent: Dec. 27, 2011

(54) ALIGNMENT DEVICE AND METHOD FOR OPTICAL SYSTEM

(75) Inventor: Kenta Sudo, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/730,673

(22) Filed: Mar. 24, 2010

(65) Prior Publication Data

US 2010/0177315 A1  Jul. 15, 2010

Related U.S. Application Data

(63) Continuation of application No. PCT/JP2008/066649, filed on Sep. 16, 2008.

(30) Foreign Application Priority Data

Sep. 25, 2007 (JP) .................................. 2007-246440
Nov. 15, 2007 (JP) .................................. 2007-296306

(51) Int. Cl.
*G01B 11/00* (2006.01)
*G01B 11/14* (2006.01)

(52) U.S. Cl. .......................... 356/400; 356/399; 356/614

(58) Field of Classification Search .......................... None
See application file for complete search history.

(56) References Cited

U.S. PATENT DOCUMENTS

| 2,401,706 | A | * | 6/1946 | Mihalyi | 356/6 |
|---|---|---|---|---|---|
| 3,326,619 | A | * | 6/1967 | Johnson et al. | 250/203.1 |
| 3,471,237 | A | * | 10/1969 | Hall | 356/72 |
| 4,146,329 | A | * | 3/1979 | King et al. | 356/139.05 |
| 5,198,653 | A | * | 3/1993 | Shen et al. | 250/201.9 |
| 5,276,497 | A | * | 1/1994 | Oono | 356/153 |
| 5,347,387 | A | * | 9/1994 | Rice | 398/129 |
| 5,465,170 | A | * | 11/1995 | Arimoto | 398/129 |
| 5,513,000 | A | * | 4/1996 | Smith et al. | 356/152.2 |
| 5,710,652 | A | * | 1/1998 | Bloom et al. | 398/129 |
| 6,822,732 | B2 | * | 11/2004 | Kaneko et al. | 356/4.05 |
| 7,277,223 | B2 | * | 10/2007 | Baun et al. | 359/399 |
| 7,595,942 | B2 | * | 9/2009 | Koenig | 359/819 |
| 2006/0279838 | A1 | | 12/2006 | Kim et al. | |

FOREIGN PATENT DOCUMENTS

| JP | 06-337355 A | 12/1994 |
|---|---|---|
| JP | 2000-121724 A | 4/2000 |
| JP | 2002-318157 A | 10/2002 |
| WO | WO 03/027621 A2 | 4/2003 |

* cited by examiner

*Primary Examiner* — Gordon Stock, Jr.

(74) *Attorney, Agent, or Firm* — Miles & Stockbridge P.C.

(57) ABSTRACT

An alignment device is provided for aligning a primary mirror with a secondary mirror in an optical system having the primary mirror and the secondary mirror arranged so as to face each other along the optical axis. The alignment device has a dichroic film formed on a surface on the front side of the secondary mirror and configured to reflect light used in the optical system and to transmit alignment light, a back reflecting surface formed on the back side of the secondary mirror and configured to reflect the alignment light, and a detection system which detects a positional deviation between the primary mirror and the secondary mirror, based on the alignment light having traveled via the dichroic film, the back reflecting surface, and a reflecting surface of the primary mirror.

15 Claims, 12 Drawing Sheets

ALIGNMENT DEVICE AND METHOD FOR OPTICAL SYSTEM

CROSS-REFERENCE TO RELATED APPLICATIONS

This application is a continuation application of PCT/JP2008/066649 designating United States, filed on Sep. 16, 2008, which is based upon and claims the benefit of priorities from Japanese Patent Application Nos. 2007-246440, filed on Sep. 25, 2007 and 2007-296306, filed on Nov. 15, 2007, the entire contents of which are incorporated herein by reference.

BACKGROUND

1. Field

One embodiment of the present invention relates to an alignment device and method for optical system, for example, alignment (position adjustment) between a primary mirror and a secondary mirror in a laser optical apparatus such as a laser irradiation device or a laser ranging device.

2. Description of the Related Art

A known laser optical apparatus of this kind is a laser radar device having a light-sending optical system for sending laser light upward into the sky, and a light-receiving optical system for receiving scattered laser light of the laser light sent from the light-sending optical system, for example, as described in Japanese Patent Application Laid-open No. 2000-121724. U.S. Pat. Published Application No. 2006/0279838A1 discloses an alignment optical system applicable to position adjustment between a primary mirror and a secondary mirror in a Cassegrain optical system, in a laser optical apparatus adopting a large-diameter reflecting optical system like the laser radar device.

BRIEF DESCRIPTION OF THE DRAWINGS

A general architecture that implements the various features of the invention will now be described with reference to the drawings. The drawings and the associated description are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an alignment device for aligning a primary mirror with a secondary mirror in an optical system having the primary mirror and the secondary mirror arranged so as to face each other along the optical axis, the alignment device comprises: a dichroic film formed on a surface on the front side of the secondary mirror and configured to reflect light used in the optical system and to transmit alignment light; a back optical surface formed on the back side of the secondary mirror and configured to reflect or refract the alignment light; and a detection system which detects a positional deviation between the primary mirror and the secondary mirror, based on the alignment light having traveled via the dichroic film, the back optical surface, and a reflecting surface of the primary mirror.

Figure 1:
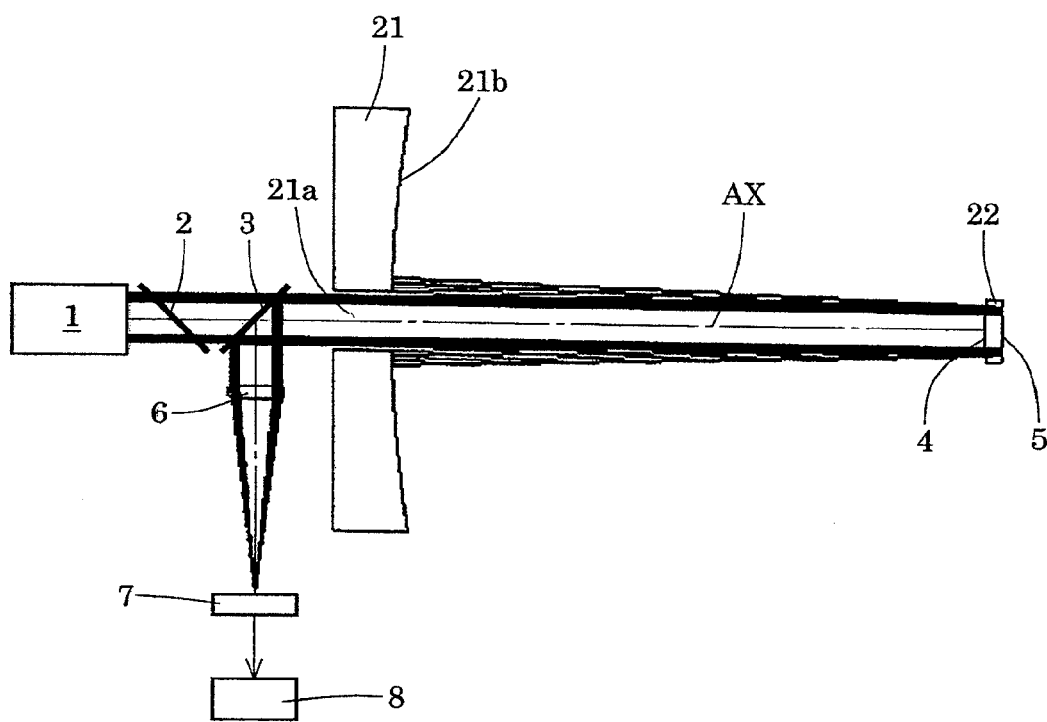
FIG. 1 is a drawing schematically showing an exemplary configuration of an alignment device according to the first embodiment.

The Embodiments will be described on the basis of the accompanying drawings. FIG. 1 is a drawing schematically showing a configuration of an alignment device according to the first embodiment. The first embodiment is applicable to the alignment device for aligning a primary mirror with a secondary mirror in a Cassegrain optical system. With reference to FIG. 1, a laser optical apparatus, for example, like a laser radar device is provided with a primary mirror 21 and a secondary mirror 22 arranged so as to face each other along the optical axis AX.

The primary mirror 21 is a concave reflecting mirror having a through hole 21a formed in the center, and a reflecting surface 21b of a concave shape formed on the front side (secondary mirror 22 side). The secondary mirror 22 is a convex reflecting mirror having a reflecting surface 4 of a convex shape formed on the front side (primary mirror 21 side). Namely, the primary mirror 21 and the secondary mirror 22 constitute a Cassegrain optical system. The configuration and action of the front reflecting surface 4 of the secondary mirror 22 will be described later.

The alignment device of the first embodiment has a light source 1 for supplying alignment light, for example, having an annular cross section. The alignment light emitted from the light source 1 is incident to a dichroic mirror 2. The dichroic mirror 2 has properties to reflect laser light which is light used in the Cassegrain optical system consisting of the primary mirror 21 and the secondary mirror 22, and to transmit the alignment light. Therefore, the alignment light from the light source 1 travels through the dichroic mirror 2 to enter a beam splitter 3.

Figure 2:
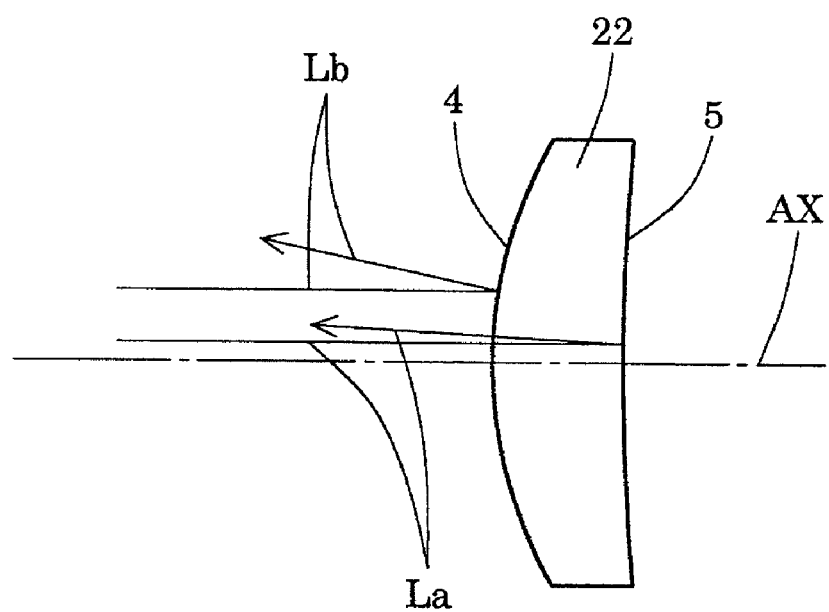
FIG. 2 is a drawing showing an exemplary state in which a dichroic film is formed on a front surface of a secondary mirror and a back reflecting surface on the back of the secondary mirror, in the first embodiment.

The alignment light transmitted by the beam splitter 3 passes through the center through hole 21a of the primary mirror 21 to be incident in a state of a parallel beam to the secondary mirror 22. As shown in FIG. 2, a dichroic film 4 to reflect the light Lb used in the Cassegrain optical system (21, 22) and to transmit the alignment light La is formed on the front surface of the secondary mirror 22. On the other hand, a back reflecting surface 5 to reflect the alignment light La is formed as a back optical surface on the back side of the secondary mirror 22 (the opposite side to the primary mirror 21).

The surface shape of the back reflecting surface 5 is so determined that the alignment light incident in the parallel beam state to the dichroic film 4 on the secondary mirror 22 is normally incident to the reflecting surface 21b of the primary mirror 21. More specifically, the surface shape of the back reflecting surface 5 and the refractive index for the alignment light of an optical material (quartz or the like) forming the main body of the secondary mirror 22 are so determined that the alignment light incident in the parallel beam state to the dichroic film 4 is normally incident to the reflecting surface 21b of the primary mirror 21.

Consequently, the alignment light incident in the parallel beam state to the secondary mirror 22 travels through the dichroic film 4, propagates inside the main body of the secondary mirror 22, and then is incident to the back reflecting surface 5. The alignment light reflected on the back reflecting surface 5 propagates inside the main body of the secondary mirror 22, travels through the dichroic film 4, and then is normally incident to the reflecting surface 21b of the primary mirror 21. The alignment light reflected on the reflecting surface 21b of the primary mirror 21 travels along the same optical path as the forward path, back to the beam splitter 3.

Namely, the alignment light reflected on the reflecting surface 21b of the primary mirror 21 travels through the dichroic film 4, is reflected on the back reflecting surface 5, travels again through the dichroic film 4, passes through the center through hole 21a of the primary mirror 21, and then is incident to the beam splitter 3. The alignment light reflected by the beam splitter 3 travels through a condensing optical system 6 to enter a photodetector 7, for example, like a two-dimensional CCD. The photodetector 7 has a detection surface positioned at the rear focal position of the condensing optical system 6. The output from the photodetector 7 is supplied to a signal processor 8.

Figure 3:
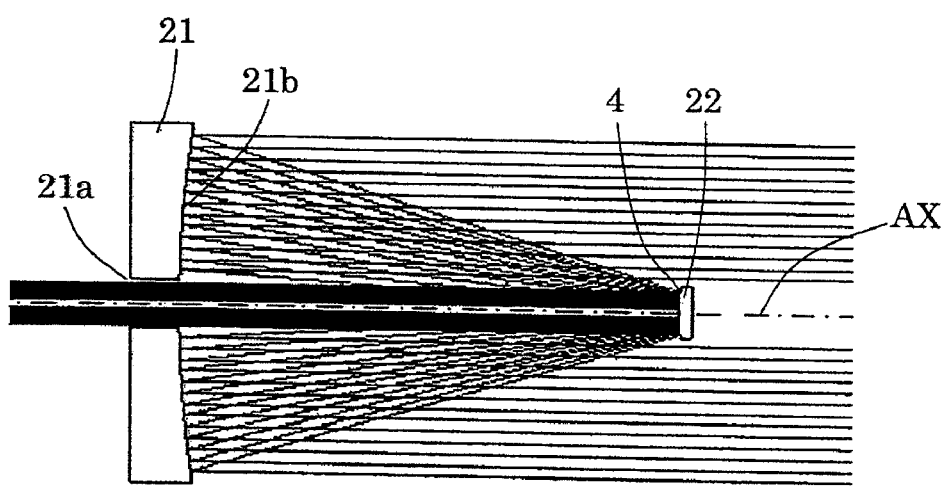
FIG. 3 is a drawing showing an exemplary operating state of a laser radar device to which the alignment device of the first embodiment is applied.

When the laser radar device is in an operating state, a laser light source (not shown) supplies laser light, for example, having an annular cross section. The laser light from the laser light source is reflected by the dichroic mirror 2, and travels through the beam splitter 3 to be guided to the Cassegrain optical system (21, 22). The laser light guided to the Cassegrain optical system (21, 22) passes through the center through hole 21a of the primary mirror 21 and is incident in a parallel beam state to the secondary mirror 22, as shown in FIG. 3.

The laser light incident to the secondary mirror 22 is successively reflected on the dichroic film 4 forming the front reflecting surface of the secondary mirror 22 and on the reflecting surface 21b of the primary mirror 21, and thereafter is sent, for example, upward in a parallel beam state into the sky. Scattered laser light from a target irradiated with the laser light is successively reflected on the reflecting surface 21b of the primary mirror 21 and on the dichroic film 4 of the secondary mirror 22, passes through the center through hole 21a of the primary mirror 21, travels through the beam splitter 3, and is reflected by the dichroic mirror 2 to arrive at a light receiving part (not shown).

When the laser radar device is in a state in which the primary mirror 21 and the secondary mirror 22 are accurately aligned with each other along the optical axis AX, the alignment light coming back to the beam splitter 3 after normal incidence to the reflecting surface 21b of the primary mirror 21 is in the parallel beam state as the alignment light incident from the beam splitter 3 to the dichroic film 4 on the secondary mirror 22 is. Therefore, the alignment light forms a small light spot at a predetermined position intersecting with the optical axis AX (e.g., at the center position of the detection surface) on the detection surface of the photodetector 7.

On the other hand, when the device is in a state in which the primary mirror 21 and the secondary mirror 22 are misaligned relative to each other, the alignment light forms a light spot at a position deviating from the predetermined position on the detection surface of the photodetector 7. The signal processor 8 acquires position information (positional deviation from the predetermined position) of the light spot formed on the detection surface of the photodetector 7, based on the output from the photodetector 7, and detects information about the positional deviation (a shift in a direction perpendicular to the optical axis AX, an inclination (tilt) relative to the optical axis AX, or the like) between the primary mirror 21 and the secondary mirror 22, i.e., an alignment error, based on the position information of the light spot. As described above, the condensing optical system 6, photodetector 7, and signal processor 8 constitute a detection system for detecting the positional deviation between the primary mirror 21 and the secondary mirror 22, based on the alignment light having been successively reflected on the back reflecting surface 5, the reflecting surface 21b of the primary mirror 21, and the back reflecting surface 5.

The alignment device of the first embodiment is configured to perform alignment (position adjustment) of the primary mirror 21 and the secondary mirror 22 so as to lead the light spot formed on the detection surface of the photodetector 7, to the predetermined position, based on the positional deviation information between the primary mirror 21 and the secondary mirror 22 detected by the signal processor 8. Specifically, the alignment between the primary mirror 21 and the secondary mirror 22 is implemented by changing the position or posture of at least one of the primary mirror 21 and the secondary mirror 22.

The alignment between the primary mirror 21 and the secondary mirror 22 may be carried out manually or automatically, for example, through a driving system configured to operate on the basis of a command from the signal processor 8. In this manner, the alignment device of the first embodiment is able to perform the position adjustment between the primary mirror 21 and the secondary mirror 22 in the Cassegrain optical system of the laser radar device, without substantial occurrence of loss in quantity of light, in accordance with the simple configuration.

The laser radar device is sometimes operated to focus on a target at a finite distance, for example, by moving the secondary mirror 22 along the optical axis AX. On that occasion, focusing can be implemented by moving the condensing optical system 6 along the optical axis AX so that the light spot formed on the detection surface of the photodetector 7 becomes sufficiently small, in the alignment device of the first embodiment. The below will describe the first example which is a specific numerical example of the first embodiment.

First Example

Table (1) below provides values of specifications of the Cassegrain optical system in an operating state for a target at infinity of the laser radar device. In Table (1), the surface number represents an order of each surface to which the used light (wavelength 1064 nm) of the laser radar device is incident, r the radius of curvature of each surface (unit: mm; radius of curvature at top in the case of an aspherical surface), d an axial space of each surface, i.e., a surface separation to a next surface (unit: mm), and κ the conical coefficient (conic constant) to define an aspherical shape of each surface.

An aspherical surface is represented by Formula (a) below, where y is a height in a direction perpendicular to the optical axis, z a distance (sag) along the optical axis from a tangent plane at a top of the aspherical surface to a position on the aspherical surface at the height y, r the radius of curvature at the top, and κ the conical coefficient. In Tables (1), (2), (4), and (5) below, each surface formed in the aspherical shape is accompanied by mark * to the right of the surface number.

$$z=(y^2/r)/[1+\{1-(\kappa+1)\cdot y^2/r^2\}^{1/2}] \quad (a)$$

The radius r of curvature is positive for a convex surface on the light source side and negative for a concave surface on the light source side. In the Cassegrain optical system of the first example, the diameter of the entrance pupil is 37.5 mm, the diameter of the center shielding of the used light 7.0 mm, and the beam enlargement magnification 8×. The same notation in Table (1) also applies to Table (4) below.

TABLE (1)

| Surface | | | |
|---|---|---|---|
| Surface No. | r | d | κ |
| 1* | 125.0000 | −437.50 (d1) | −1 (dichroic film 4 of secondary mirror 22) |
| 2* | 1000.0000 | ∞ (d2) | −1 (reflecting surface 21b of primary mirror 21) |

Table (2) below provides values of specifications of the alignment optical system of the alignment device applied to the position adjustment of the Cassegrain optical system in the operating state for the target at infinity. In Table (2), the surface number represents an order of each surface to which the alignment light is incident, r the radius of curvature of each surface (unit: mm; radius of curvature at top in the case of an aspherical surface), d an axial space of each surface, i.e., a surface separation to a next surface (unit: mm), κ the conical coefficient (conic constant) to define an aspherical shape of each surface, and n the refractive index for the alignment light of a medium from each surface to a next surface.

The radius r of curvature is positive for a convex surface on the light source side and negative for a concave surface on the light source side. As for the condensing optical system 6, however, the radius r of curvature is negative for a convex surface on the light entrance side and positive for a concave surface on the light entrance side. The surface separation d shall change its sign at every time of reflection. In the alignment optical system of the first example, the diameter of the entrance pupil is 37.5 mm, the diameter of the center shielding of the alignment light 18.75 mm, and the wavelength of the alignment light 632.8 nm. The same notation in Table (2) also applies to Table (5) below.

TABLE (2)

| (Specifications of Optical Members) | | | | |
|---|---|---|---|---|
| Surface No. | r | d | κ | n |
| 1* | 125.0000 | 12.50 | −1 | 1.457021 (film 4 of secondary mirror 22) |
| 2 | 308.8271 | −12.50 | | 1.457021 (reflecting surface 5 of secondary mirror 22) |
| 3* | 125.0000 | −437.50 (d1) | −1 | (film 4 of secondary mirror 22) |
| 4* | 1000.0000 | 437.50 (d3) | −1 | (reflecting surface 21b of primary mirror 21) |
| 5* | 125.0000 | 12.50 | −1 | 1.457021 (reflecting surface 4 of secondary mirror 22) |
| 6 | 308.8271 | −12.50 | | 1.457021 (reflecting surface 5 of secondary mirror 22) |
| 7* | 125.0000 | −537.50 (d4) | −1 | (film 4 of secondary mirror 22) |
| 8 | ∞ | −50.00 (d5) | | (beam splitter 3) |
| 9 | −89.7382 | −10.00 | | 1.457021 (condensing optical system 6) |
| 10 | 347.3046 | −150.00 (d6) | | |

Table (3) below provides values of the surface separations in the Cassegrain optical system and the alignment optical system for the target at infinity, and the surface separations in the Cassegrain optical system and the alignment optical system for a target at a finite distance (100 m). In Table (3), the surface separation d1 is a distance along the optical axis AX from the dichroic film 4 of the secondary mirror 22 to the reflecting surface 21b of the primary mirror 21, as shown in Table (1) and Table (2). The surface separation d2 is a distance from the reflecting surface 21b of the primary mirror 21 to the target at infinity, as shown in Table (1).

The surface separation d3 is a distance along the optical axis AX from the reflecting surface 21b of the primary mirror 21 to the dichroic film 4 of the secondary mirror 22, as shown in Table (2). The surface separation d4 is a distance along the optical axis AX from the dichroic film 4 of the secondary mirror 22 to the beam splitter 3, as shown in Table (2). The surface separation d5 is a distance along the optical axis AX from the beam splitter 3 to the entrance surface of the condensing optical system 6, as shown in Table (2). The surface separation d6 is a distance along the optical axis AX from the exit surface of the condensing optical system 6 to the detection surface of the photodetector 7, as shown in Table (2).

TABLE (3)

| Surface separation | target at infinity | target at finite distance |
|---|---|---|
| d1 | −437.50 | −440.08 |
| d2 | ∞ | 100000.00 |
| d3 | 437.50 | 440.08 |
| d4 | −537.50 | −540.08 |
| d5 | −50.00 | −50.37 |
| d6 | −150.00 | −149.63 |

With reference to Table (3), the Cassegrain optical system in the laser radar device according to the first example can be focused on the target at the finite distance of 100 m from the target at infinity by moving the secondary mirror 22 by 2.58 mm to the right in FIG. 1 along the optical axis AX. At this time, the alignment optical system of the first example can be focused by moving the condensing optical system 6 by 0.37 mm down in FIG. 1 along the optical axis AX.

Figure 4:
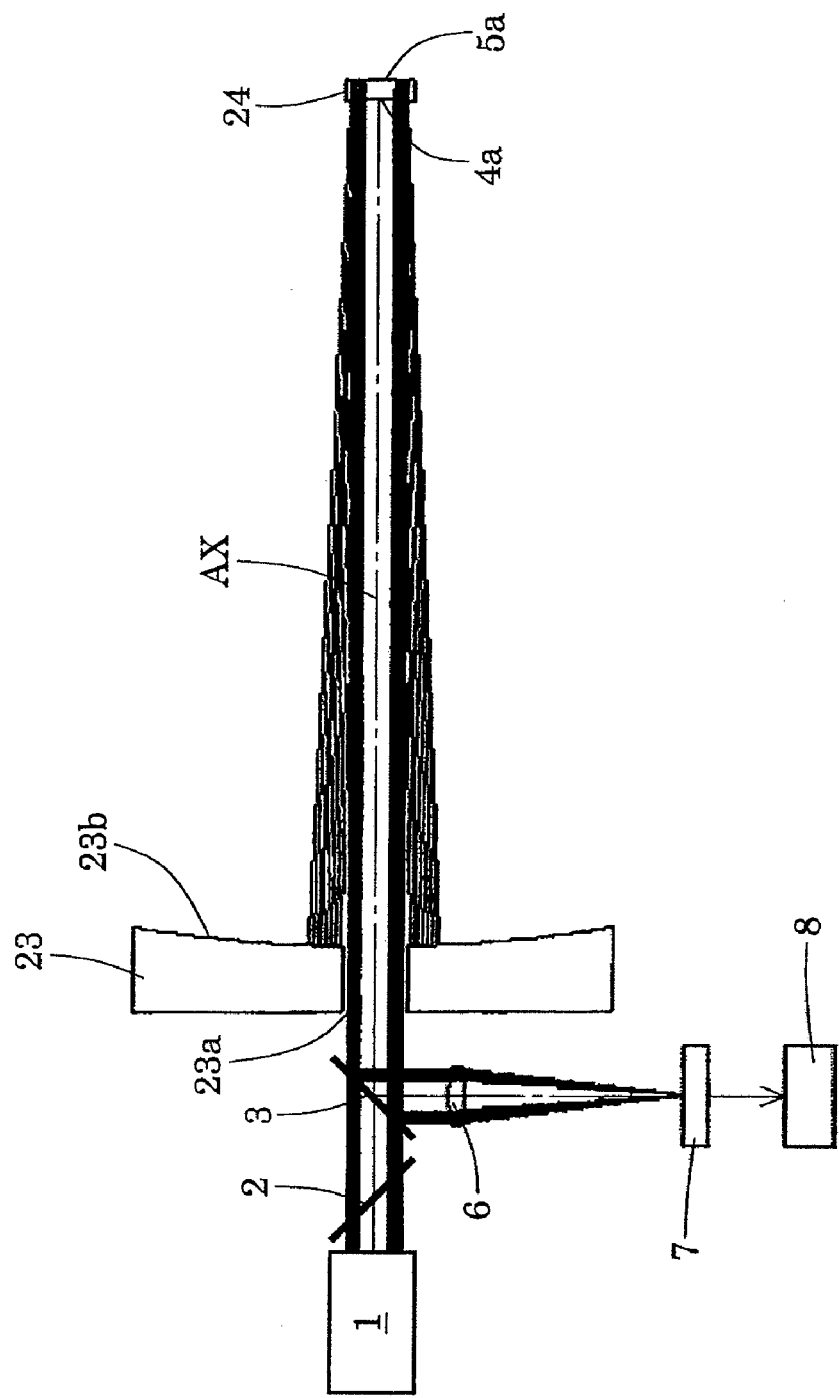
FIG. 4 is a drawing a schematically showing an exemplary configuration of an alignment device according to the second embodiment.

FIG. 4 is a drawing schematically showing a configuration of an alignment device according to the second embodiment. The second embodiment is an application of the alignment device for aligning a primary mirror with a secondary mirror in a Gregorian optical system. With reference to FIG. 4, a laser optical apparatus, for example, like a laser radar device is provided with a primary mirror 23 and a secondary mirror 24 arranged so as to face each other along the optical axis AX.

The primary mirror 23 is a concave reflecting mirror having a through hole 23a formed in the center, and a reflecting surface 23b of a concave shape formed on the front side (secondary mirror 24 side). The secondary mirror 24 is a concave reflecting mirror having a reflecting surface 4a of a concave shape formed on the front side (primary mirror 23 side). Namely, the primary mirror 23 and the secondary mirror 24 constitute a Gregorian optical system. The configuration and action of the front reflecting surface 4a of the secondary mirror 24 will be described later.

The alignment device of the second embodiment has a configuration similar to that of the first embodiment. The configuration and operation of the alignment device of the second embodiment will be described below with focus on differences from the first embodiment. In the alignment device of the second embodiment, the alignment light emitted from the light source 1 has, for example, an annular cross section, and travels through the dichroic mirror 2, the beam splitter 3, and the center through hole 23a of the primary mirror 23 to be incident in the parallel beam state to the secondary mirror 24.

Figure 5:
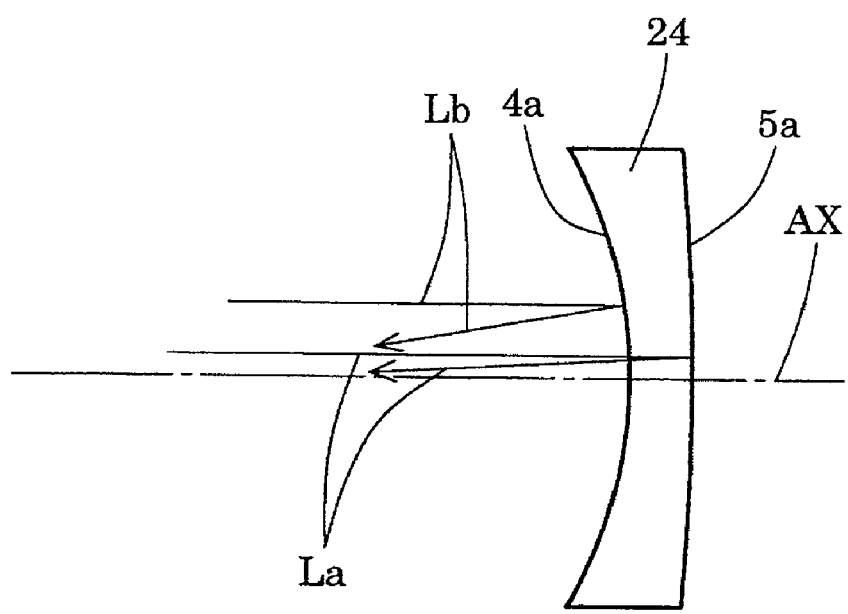
FIG. 5 is a drawing showing an exemplary state in which a dichroic film is formed on a front surface of a secondary mirror and a back reflecting surface on the back of the secondary mirror, in the second embodiment.

As shown in FIG. 5, a dichroic film 4a to reflect the used light Lb in the Gregorian optical system (23, 24) and to transmit the alignment light La is formed on the front surface of the secondary mirror 24. A back reflecting surface 5a to reflect the alignment light La is formed on the back side of the secondary mirror 24 (the opposite side to the primary mirror 23). The surface shape of the back reflecting surface 5a and the refractive index for the alignment light of an optical material forming the main body of the secondary mirror 24 are so determined that the alignment light incident in the parallel beam state to the dichroic film 4a is normally incident to the reflecting surface 23b of the primary mirror 23.

Therefore, the alignment light incident in the parallel beam state to the secondary mirror 24 travels through the dichroic film 4a, is reflected on the back reflecting surface 5a, and travels through the dichroic film 4a to be normally incident to the reflecting surface 23b of the primary mirror 23. The alignment light reflected on the reflecting surface 23b of the primary mirror 23 travels along the same optical path as the forward path, back to the beam splitter 3. Namely, the alignment light reflected on the reflecting surface 23b of the primary mirror 23 travels through the dichroic film 4a, is reflected on the back reflecting surface 5a, and travels through the dichroic film 4a and the center through hole 23a of the primary mirror 23 to enter the beam splitter 3. The alignment light reflected by the beam splitter 3 travels through the condensing optical system 6 to reach the photodetector 7.

Figure 6:
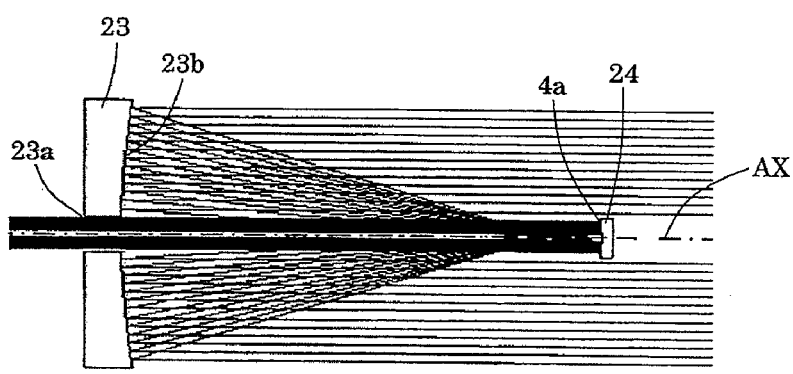
FIG. 6 is a drawing showing an exemplary operating state of a laser radar device to which the alignment device of the second embodiment is applied.

When the laser radar device in the second embodiment is in the operating state, the laser light from the laser light source (not shown) has, for example, an annular cross section and is guided via the dichroic mirror 2 and the beam splitter 3 to the Gregorian optical system (23, 24). The laser light guided to the Gregorian optical system (23, 24) passes through the center through hole 23a of the primary mirror 23 and is incident in the parallel beam state to the secondary mirror 24, as shown in FIG. 6.

The laser light incident to the secondary mirror 24 is successively reflected on the dichroic film 4a of the secondary mirror 24 and on the reflecting surface 23b of the primary mirror 23, and thereafter is sent, for example, upward in the parallel beam state into the sky. Scattered laser light from a target irradiated with the laser light is successively reflected on the reflecting surface 23b of the primary mirror 23 and on the dichroic film 4a of the secondary mirror 24, and travels via the center through hole 23a of the primary mirror 23, the beam splitter 3, and the dichroic mirror 2 to reach a light receiving part (not shown).

The alignment device of the second embodiment, as in the case of the first embodiment, is able to perform the alignment between the primary mirror 23 and the secondary mirror 24 so as to lead the light spot formed on the detection surface of the photodetector 7, to the predetermined position, based on the positional deviation information between the primary mirror 23 and the secondary mirror 24 detected by the signal processor 8. Namely, the second embodiment also allows the position adjustment between the primary mirror 23 and the secondary mirror 24 in the Gregorian optical system of the laser radar device, without substantial occurrence of loss in quantity of light, in accordance with the simple configuration. The below will describe the second example which is a specific numerical example of the second embodiment.

Second Example

Table (4) below provides values of specifications of the Gregorian optical system in an operating state for a target at infinity of the laser radar device. In the Gregorian optical system of the second example, the diameter of the entrance pupil is 37.5 mm, the diameter of the center shielding of the used light 7.0 mm, and the beam enlargement magnification 8×.

TABLE (4)

| Surface No. | r | d | κ | |
|---|---|---|---|---|
| 1* | −125.0000 | −562.50 (d7) | −1 | (dichroic film 4a of secondary mirror 24) |
| 2* | 1000.0000 | ∞ (d8) | −1 | (reflecting surface 23b of primary mirror 23) |

Table (5) below provides values of specifications of the alignment optical system of the alignment device applied to the position adjustment of the Gregorian optical system in the operating state for the target at infinity. In the alignment optical system of the second example, the diameter of the entrance pupil is 37.5 mm, the diameter of the center shielding of the alignment light 18.75 mm, and the wavelength of the alignment light 632.8 nm.

TABLE (5)

| (Specifications of Optical Members) | | | | |
|---|---|---|---|---|
| Surface No. | r | d | κ | n |
| 1* | −125.0000 | 12.50 | −1 | 1.457021 (film 4a of secondary mirror 24) |
| 2 | −594.9449 | −12.50 | | 1.457021 (reflecting surface 5a of secondary mirror 24) |
| 3* | −125.0000 | −562.50 (d7) | 1 | (film 4a of secondary mirror 24) |
| 4* | 1000.0000 | 562.50 (d9) | −1 | (reflecting surface 23b of primary mirror 23) |

TABLE (5)-continued (Specifications of Optical Members)

| Surface No. | r | d | κ | n |
|---|---|---|---|---|
| 5* | −125.0000 | 12.50 | −1 | 1.457021 (film 4a of secondary mirror 24) |
| 6 | −594.9449 | −12.50 | | 1.457021 (reflecting surface 5a of secondary mirror 24) |
| 7* | −125.0000 | −662.50 (d10) | −1 | (film 4a of secondary mirror 24) |
| 8 | ∞ | −50.00 (d11) | | (beam splitter 3) |
| 9 | −86.8150 | −10.00 | | 1.457021 (condensing optical system 6) |
| 10 | 402.1376 | −150.00 (d12) | | |

Table (6) below provides values of the surface separations in the Gregorian optical system and the alignment optical system for the target at infinity, and the surface separations in the Gregorian optical system and the alignment optical system for a target at a finite distance (100 m). In Table (6), the surface separation d7 is a distance along the optical axis AX from the dichroic film 4a of the secondary mirror 24 to the reflecting surface 23b of the primary mirror 23, as shown in Table (4) and Table (5). The surface separation d8 is a distance from the reflecting surface 23b of the primary mirror 23 to the target at infinity, as shown in Table (4).

The surface separation d9 is a distance along the optical axis AX from the reflecting surface 23b of the primary mirror 23 to the dichroic film 4a of the secondary mirror 24, as shown in Table (5). The surface separation d10 is a distance along the optical axis AX from the dichroic film 4a of the secondary mirror 24 to the beam splitter 3, as shown in Table (5). The surface separation d11 is a distance along the optical axis AX from the beam splitter 3 to the entrance surface of the condensing optical system 6, as shown in Table (5). The surface separation d12 is a distance along the optical axis AX from the exit surface of the condensing optical system 6 to the detection surface of the photodetector 7, as shown in Table (5).

TABLE (6)

| Surface separation | target at infinity | target at finite distance |
|---|---|---|
| d7 | −562.50 | −565.08 |
| d8 | ∞ | 100000.00 |
| d9 | 562.50 | 565.08 |
| d10 | −662.50 | −665.08 |
| d11 | −50.00 | −50.59 |
| d12 | −150.00 | −149.41 |

With reference to Table (6), the Gregorian optical system in the laser radar device according to the second example can be focused on the target at the finite distance of 100 m from the target at infinity by moving the secondary mirror 24 by 2.58 mm to the right in FIG. 4 along the optical axis AX. At this time, the alignment optical system of the second example can be focused by moving the condensing optical system 6 by 0.59 mm down in FIG. 4 along the optical axis AX.

In the alignment devices according to the first and second embodiments, the dichroic film to reflect the used light of the optical system and to transmit the alignment light is formed on the front surface of the secondary mirror and the back reflecting surface to reflect the alignment light is formed on the back of the secondary mirror, for achieving the position adjustment between the primary mirror and the secondary mirror in the optical system having the primary mirror and the secondary mirror arranged so as to face each other along the optical axis. The surface shape of the back reflecting surface is so determined, for example, that the alignment light incident in the parallel beam state to the dichroic film is normally incident to the reflecting surface of the primary mirror.

As a result, the device is able to detect the positional deviation between the primary mirror and the secondary mirror, based on the alignment light having entered the dichroic film on the secondary mirror and having been successively reflected on the back reflecting surface, the reflecting surface of the primary mirror, and the back reflecting surface, and to perform the position adjustment between the primary mirror and the secondary mirror, based on the detected positional deviation information between the primary mirror and the secondary mirror. Namely, the alignment devices and methods according to the first and second embodiments allow the position adjustment between the primary mirror and the secondary mirror in the optical system, without substantial occurrence of loss in quantity of light, in accordance with the simple configurations.

Figure 7:
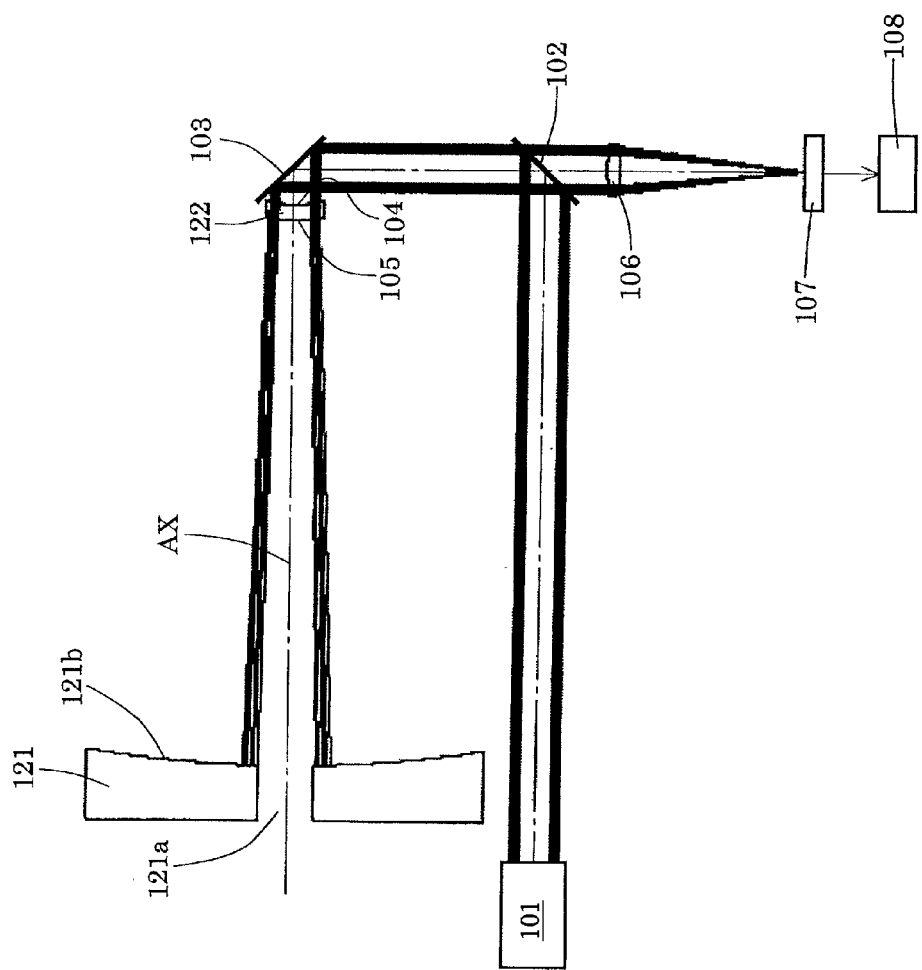
FIG. 7 is a drawing schematically showing an exemplary configuration of an alignment device according to the third embodiment.

FIG. 7 is a drawing schematically showing a configuration of an alignment device according to the third embodiment of the present invention. The third embodiment is an application of the alignment device for aligning a primary mirror with a secondary mirror in a Cassegrain optical system. With reference to FIG. 7, a laser optical apparatus, for example, like a laser radar device is provided with a primary mirror 121 and a secondary mirror 122 arranged so as to face each other along the optical axis AX.

The primary mirror 121 is a concave reflecting mirror having a through hole 121a formed in the center, and a reflecting surface 121b of a concave shape formed on the front side (secondary mirror 122 side). The secondary mirror 122 has a lens like form as a whole and is a convex reflecting mirror having a reflecting surface 105 of a convex shape formed on the front side (primary mirror 121 side). Namely, the primary mirror 121 and the secondary mirror 122 constitute a Cassegrain optical system. The configuration and action of the front reflecting surface 105 of the secondary mirror 122 will be described later.

The alignment device of the third embodiment is provided with a light source 101 for supplying alignment light, for example, having an annular cross section. The alignment light emitted from the light source 101 is incident to a beam splitter 102. The alignment light reflected by the beam splitter 102 is reflected on a reflecting surface of a back reflecting member 103 arranged on the back side of the secondary mirror 122, and thereafter is incident to the secondary mirror 122 from the back (the opposite side to the primary mirror 121; the right side in FIG. 7).

Figure 8:
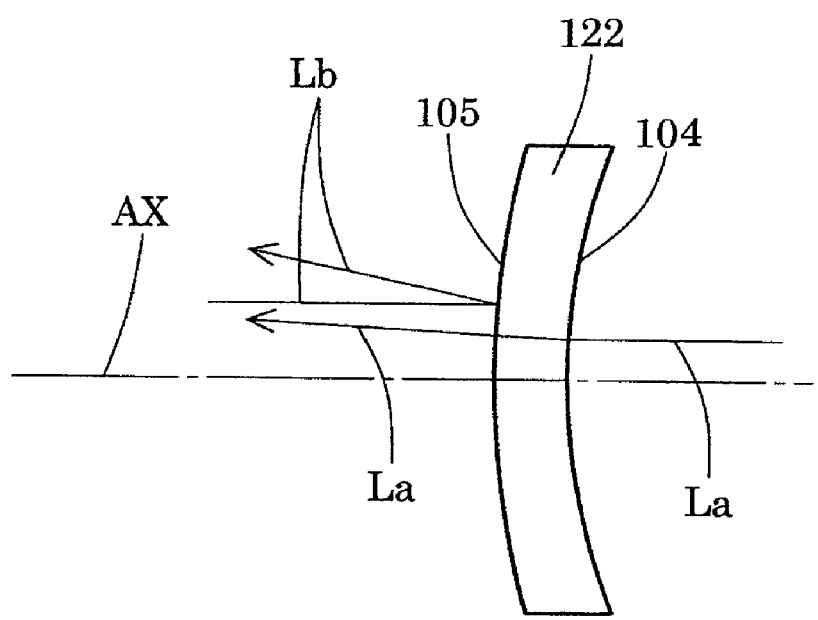
FIG. 8 is a drawing showing a state in which a dichroic film is formed on a front surface of a secondary mirror of a lens shape and a back refracting surface on the back of the secondary mirror, in the third embodiment.

As shown in FIG. 8, a dichroic film 105 to reflect the used light Lb in the Cassegrain optical system (121, 122) and to transmit the alignment light La is formed on the front (left in FIG. 8) surface of the secondary mirror 122. On the other hand, a back refracting surface 104 to refract the alignment light La is formed as a back optical surface on the back side (the right side in FIG. 8) of the secondary mirror 122. The alignment light reflected on the reflecting surface of the back reflecting member 103 is incident in a parallel beam state along the optical axis AX to the back refracting surface 104.

The surface shape of the back refracting surface 104 is so determined that the alignment light incident in the parallel beam state to the back refracting surface 104 is normally incident to the reflecting surface 121b of the primary mirror 121. More specifically, the surface shape of the back refracting surface 104 and the refractive index for the alignment light of an optical material (quartz or the like) forming the main body of the secondary mirror 122 are so determined that the alignment light incident in the parallel beam state to the back refracting surface 104 is normally incident through the dichroic film 105 to the reflecting surface 121b of the primary mirror 121.

Therefore, the alignment light incident in the parallel beam state to the back refracting surface 104 of the secondary mirror 122 propagates inside the main body of the secondary mirror 122, travels through the dichroic film 105, and thereafter is normally incident to the reflecting surface 121b of the primary mirror 121. The alignment light reflected on the reflecting surface 121b of the primary mirror 121 travels along the same optical path as the forward path, back to the beam splitter 102.

Namely, the alignment light reflected on the reflecting surface 121b of the primary mirror 121 travels through the dichroic film 105, is refracted by the back refracting surface 104, and is reflected on the back reflecting member 103, then to enter the beam splitter 102. The alignment light transmitted by the beam splitter 102 travels through a condensing optical system 106 to enter a photodetector 107, for example, like a two-dimensional CCD. The photodetector 107 has a detection surface positioned at the rear focal position of the condensing optical system 106. The output from the photodetector 107 is supplied to a signal processor 108.

Figure 9:
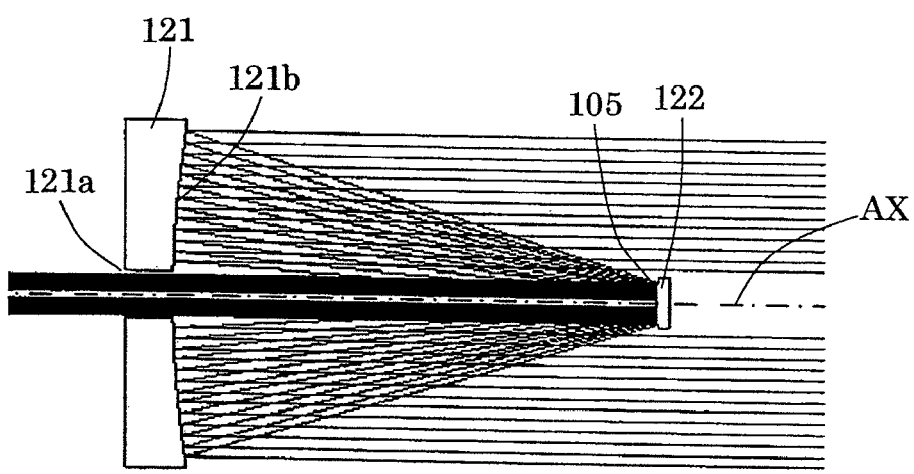
FIG. 9 is a drawing showing an exemplary operating state of a laser radar device to which the alignment device of the third embodiment is applied.

With reference to FIG. 9, when the laser radar device is in an operating state, a laser light source (not shown) supplies laser light, for example, having an annular cross section, to the Cassegrain optical system (121, 122). The laser light guided from the laser light source to the Cassegrain optical system (121, 122) passes through the center through hole 121a of the primary mirror 121 and is incident in a parallel beam state to the secondary mirror 122.

The laser light incident to the secondary mirror 122 is successively reflected on the dichroic film 105 forming the front reflecting surface of the secondary mirror 122 and on the reflecting surface 121b of the primary mirror 121, and thereafter is sent, for example, upward in the parallel beam state into the sky. Scattered laser light from a target irradiated with the laser light is successively reflected on the reflecting surface 121b of the primary mirror 121 and on the dichroic film 105 of the secondary mirror 122 and passes through the center through hole 121a of the primary mirror 121 to reach a light receiving part (not shown).

When the laser radar device is in a state in which the primary mirror 121 and the secondary mirror 122 are accurately aligned with each other along the optical axis AX, the alignment light coming back to the beam splitter 102 after normal incidence to the reflecting surface 121b of the primary mirror 121 is in a parallel beam state as the alignment light incident from the beam splitter 102 to the back refracting surface 104 of the secondary mirror 122 is. Therefore, the alignment light forms a small light spot at a predetermined position intersecting with the optical axis AX (e.g., at the center position of the detection surface) on the detection surface of the photodetector 107.

On the other hand, when the device is in a state in which the primary mirror 121 and the secondary mirror 122 are misaligned relative to each other, the alignment light forms a light spot at a position deviating from the predetermined position on the detection surface of the photodetector 107. The signal processor 108 acquires the position information (positional deviation from the predetermined position) of the light spot formed on the detection surface of the photodetector 107, based on the output from the photodetector 107, and detects information about the positional deviation (a shift in a direction perpendicular to the optical axis AX, an inclination (tilt) relative to the optical axis AX, or the like) between the primary mirror 121 and the secondary mirror 122, i.e., an alignment error, based on the position information of the light spot.

As described above, the condensing optical system 106, the photodetector 107, and the signal processor 108 constitute a detection system for detecting the positional deviation between the primary mirror 121 and the secondary mirror 122, based on the alignment light having entered the back refracting surface 104 of the secondary mirror 122 and having successively traveled via the dichroic film 105, the reflecting surface 121b of the primary mirror 121, the dichroic film 105, and the back refracting surface 104.

The alignment device of the third embodiment is configured to perform the alignment (position adjustment) between the primary mirror 121 and the secondary mirror 122 so as to lead the light spot formed on the detection surface of the photodetector 107, to the predetermined position, based on the positional deviation information between the primary mirror 121 and the secondary mirror 122 detected by the signal processor 108. Specifically, the device performs the alignment between the primary mirror 121 and the secondary mirror 122 by changing the position or posture of at least one of the primary mirror 121 and the secondary mirror 122.

The alignment between the primary mirror 121 and the secondary mirror 122 may be carried out manually or automatically, for example, through a driving system to operate based on a command from the signal processor 108. In this manner, the alignment device of the third embodiment is able to perform the position adjustment between the primary mirror 121 and the secondary mirror 122 in the Cassegrain optical system of the laser radar device, without substantial occurrence of loss in quantity of light, in accordance with the simple configuration.

The laser radar device is sometimes operated to focus on a target at a finite distance, for example, by moving the secondary mirror 122 along the optical axis AX. On that occasion, focusing can be implemented by moving the condensing optical system 106 along the optical axis AX so that the light spot formed on the detection surface of the photodetector 107 becomes sufficiently small, in the alignment device of the third embodiment. The below will describe the third example which is a specific numerical example of the third embodiment.

Third Example

Table (7) below, provides values of specifications of the Cassegrain optical system in an operating state for a target at infinity of the laser radar device. In Table (7), the surface number represents an order of each surface to which the used light (wavelength 1064 nm) of the laser radar device is incident, r the radius of curvature of each surface (unit: mm; radius of curvature at top in the case of an aspherical surface), d an axial space of each surface, i.e., a surface separation to a next surface (unit: mm), and κ the conical coefficient (conic constant) to define an aspherical shape of each surface.

An aspherical surface is represented by Formula (a) below, where y is a height in a direction perpendicular to the optical axis, z a distance (sag) along the optical axis from a tangent plane at a top of the aspherical surface to a position on the aspherical surface at the height y, r the radius of curvature at the top, and κ the conical coefficient. In Tables (7), (8), (9), and (10) below, each surface formed in the aspherical shape is accompanied by mark * to the right of the surface number.

$$z=(y^2/r)/[1+\{1-(\kappa+1)\cdot y^2/r^2\}^{1/2}] \quad (a)$$

The radius r of curvature is positive for a convex surface on the light source side of the laser radar device (the left side in FIG. 7) and negative for a concave surface on the light source side. In the Cassegrain optical system of the third example, the diameter of the entrance pupil is 37.5 mm, the diameter of the center shielding of the used light 7.0 mm, and the beam enlargement magnification 8×. The same notation in Table (7) also applies to Table (10) below.

TABLE (7)

| Surface No. | r | d | κ | |
|---|---|---|---|---|
| 1* | 125.0000 | −437.50 (d1) | −1 | (dichroic film 105 of secondary mirror 122) |
| 2* | 1000.0000 | ∞ (d2) | −1 | (reflecting surface 121b of primary mirror 121) |

Table (8) below provides values of specifications of the alignment optical system of the alignment device applied to the position adjustment of the Cassegrain optical system in the operating state for the target at infinity. In Table (8), the surface number represents an order of each surface to which the alignment light is incident, r the radius of curvature of each surface (unit: mm; radius of curvature at top in the case of an aspherical surface), d an axial space of each surface, i.e., a surface separation to a next surface (unit: mm), κ the conical coefficient (conic constant) to define an aspherical shape of each surface, and n the refractive index for the alignment light of a medium from each surface to a next surface.

The radius r of curvature is positive for a convex surface on the entrance side of the light first incident from the light source 101 of the alignment device and negative for a concave surface on the entrance side of the light first incident from the light source 101. As for the condensing optical system 106, however, the radius r of curvature is negative for a convex surface on the light entrance side and positive for a concave surface on the light entrance side. The surface separation d shall change its sign after reflection on the reflecting surface 121b of the primary mirror 121. In the alignment optical system of the third example, the diameter of the entrance pupil is 37.5 mm, the diameter of the center shielding of the alignment light 18.75 mm, and the wavelength of the alignment light 632.8 nm. The same notation in Table (8) also applies to Table (11) below.

TABLE (8)

(Specifications of Optical Members)

| Surface No. | r | d | κ | n | |
|---|---|---|---|---|---|
| 1 | ∞ | 200.00 | | | (beam splitter 102) |
| 2 | ∞ | 30.00 | | | (reflecting member 103) |
| 3 | −81.1843 | 12.50 | | 1.457021 | (refracting surface 104 of secondary mirror 122) |
| 4* | −125.0000 | 437.50 (−d1) | −1 | | (film 105 of secondary mirror 122) |
| 5* | −1000.0000 | −437.50 (d3) | −1 | | (reflecting surface 121b of primary mirror 121) |
| 6* | −125.0000 | −12.50 | −1 | 1.457021 | (film 105 of secondary mirror 122) |
| 7 | −81.1843 | −30.00 | | | (refracting surface 104 of secondary mirror 122) |
| 8 | ∞ | −250.00 (d4) | | | (reflecting member 103) |
| 9 | −180.5733 | −10.00 | | 1.457021 | (condensing optical system 106) |
| 10 | 115.6799 | −150.00 (d5) | | | |

Table (9) below provides values of the surface separations in the Cassegrain optical system and the alignment optical system for the target at infinity, and the surface separations in the Cassegrain optical system and the alignment optical system for the target at the finite distance (100 m). In Table (9), the surface separation d1 is a distance along the optical axis AX from the reflecting surface 121b of the primary mirror 121 to the dichroic film 105 of the secondary mirror 122, as shown in Table (7) and Table (8). The surface separation d2 is a distance from the reflecting surface 121b of the primary mirror 121 to the target at infinity, as shown in Table (7).

The surface separation d3 is a distance along the optical axis AX from the dichroic film 105 of the secondary mirror 122 to the reflecting surface 121b of the primary mirror 121, as shown in Table (8). The surface separation d4 is a distance along the optical axis AX from the reflecting surface of the back reflecting member 103 to the entrance surface of the condensing optical system 106, as shown in Table (8). The surface separation d5 is a distance along the optical axis AX from the exit surface of the condensing optical system 106 to the detection surface of the photodetector 107, as shown in Table (8).

TABLE (9)

| Surface separation | target at infinity | target at finite distance |
|---|---|---|
| d1 | −437.50 | −440.08 |
| d2 | ∞ | 100000.00 |
| d3 | 437.50 | 440.08 |
| d4 | −250.00 | −250.39 |
| d5 | −150.00 | −149.61 |

With reference to Table (9), the Cassegrain optical system in the laser radar device according to the third example can be focused on the target at the finite distance of 100 m from the target at infinity by moving the secondary mirror 122 by 2.58 mm to the right in FIG. 7 along optical axis AX. At this time, the alignment optical system of the third example can be focused by moving the condensing optical system 106 by 0.39 mm down in FIG. 7 along the optical axis AX.

Figure 10:
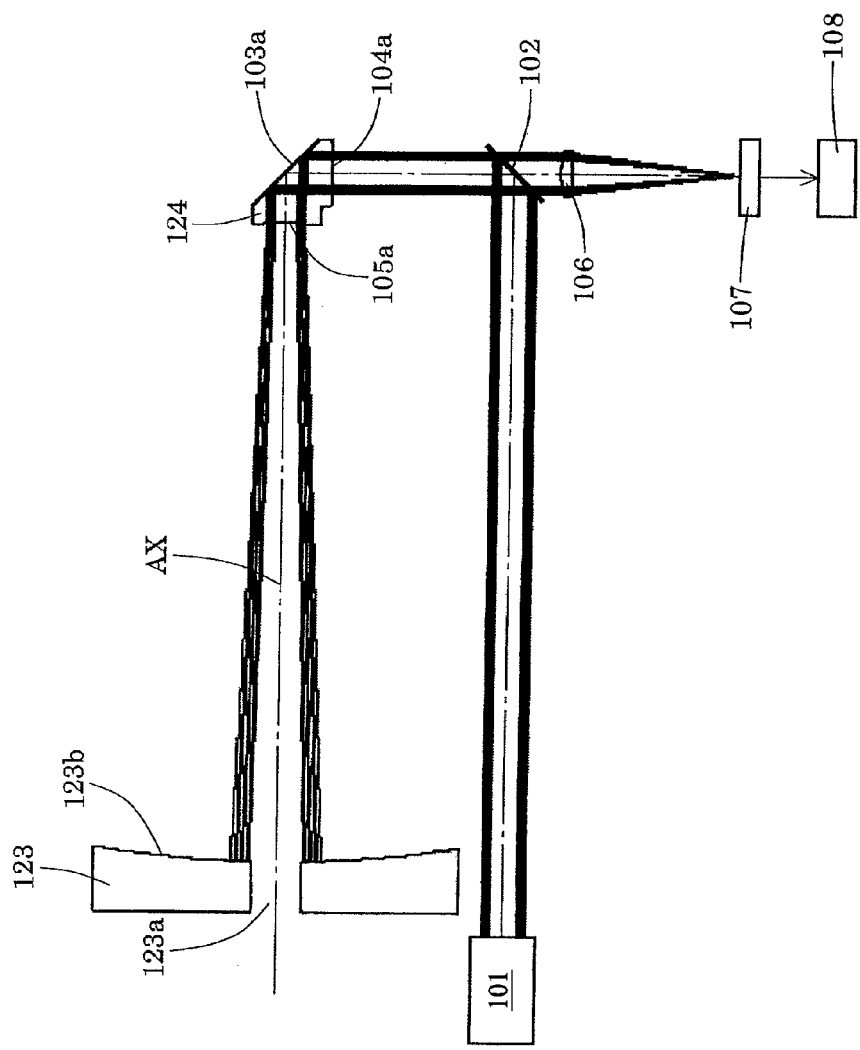
FIG. 10 is a drawing schematically showing an exemplary configuration of an alignment device according to the fourth embodiment.

FIG. 10 is a drawing schematically showing a configuration of an alignment device according to the fourth embodiment. The fourth embodiment is an application of the alignment device for aligning a primary mirror with a secondary mirror in a Gregorian optical system. With reference to FIG. 10, a laser optical apparatus, for example, like a laser radar device is provided with a primary mirror 123 and a secondary mirror 124 arranged so as to face each other along the optical axis AX.

The primary mirror 123 is a concave reflecting mirror having a through hole 123a formed in the center, and a reflecting surface 123b of a concave shape formed on the front side (secondary mirror 124 side). The secondary mirror 124 has a form of a rectangular prism shape as a whole and is a concave reflecting mirror having a reflecting surface 105a of a concave shape formed on the front side (primary mirror 123 side). Namely, the primary mirror 123 and the secondary mirror 124 constitute a Gregorian optical system. The configuration and action of the front reflecting surface 105a of the secondary mirror 124 will be described later.

The alignment device of the fourth embodiment has a configuration similar to that of the third embodiment. The configuration and operation of the alignment device of the fourth embodiment will be described below with focus on differences from the third embodiment. In the alignment device of the fourth embodiment, the alignment light emitted from the light source 101, which has, for example, an annular cross section, is reflected by the beam splitter 102 and thereafter is incident to the secondary mirror 124 from the back side (the opposite side to the primary mirror 123; the bottom side in FIG. 10).

Figure 11:
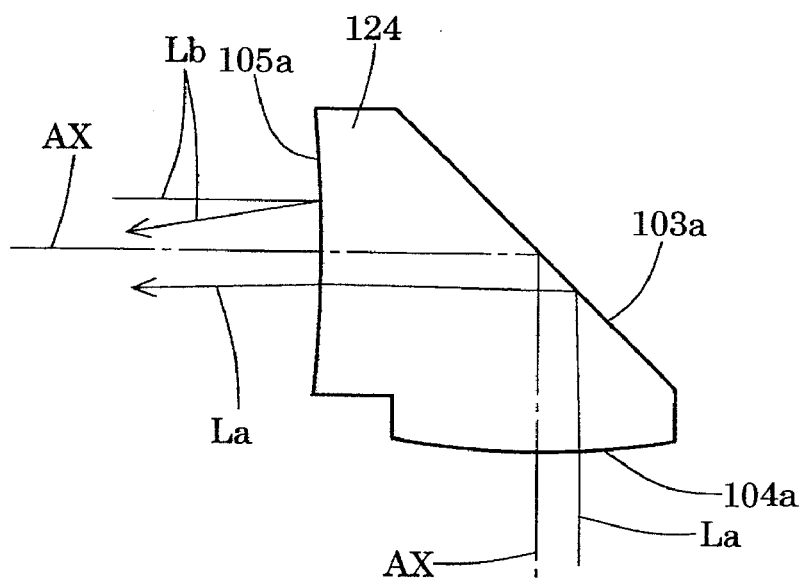
FIG. 11 is a drawing showing an exemplary state in which a dichroic film is formed on a front surface of a secondary mirror of a rectangular prism shape and a back refracting surface on the back of the secondary mirror, in the fourth embodiment.

As shown in FIG. 11, a dichroic film 105a to reflect the used light Lb in the Gregorian optical system (123, 124) and to transmit the alignment light La is formed on the front (left in FIG. 11) surface of the secondary mirror 124. On the other hand, a back refracting surface 104a to refract the alignment light La is formed on the back (bottom in FIG. 11) of the secondary mirror 124. The secondary mirror 124 has an inside reflecting surface 103a formed in an optical path between the dichroic film 105a and the back refracting surface 104a.

The alignment light reflected by the beam splitter 102 is incident in a parallel beam state along the optical axis AX to the back refracting surface 104a. The surface shape of the back refracting surface 104a and the refractive index for the alignment light of an optical material forming the main body of the secondary mirror 124 are so determined that the alignment light incident in the parallel beam state to the back refracting surface 104a is normally incident through the dichroic film 105a to the reflecting surface 123b of the primary mirror 123.

Therefore, the alignment light incident in the parallel beam state to the back refracting surface 104a of the secondary mirror 124 is reflected (totally reflected) on the inside reflecting surface 103a, travels through the dichroic film 105a, and is normally incident to the reflecting surface 123b of the primary mirror 123. The alignment light reflected on the reflecting surface 123b of the primary mirror 123 travels along the same optical path as the forward path, back to the beam splitter 102. Namely, the alignment light reflected on the reflecting surface 123b of the primary mirror 123 travels through the dichroic film 105a, is reflected on the inside reflecting surface 103a, and travels through the back refracting surface 104a to enter the beam splitter 102. The alignment light transmitted by the beam splitter 102 travels through the condensing optical system 106 to reach the photodetector 107.

Figure 12:
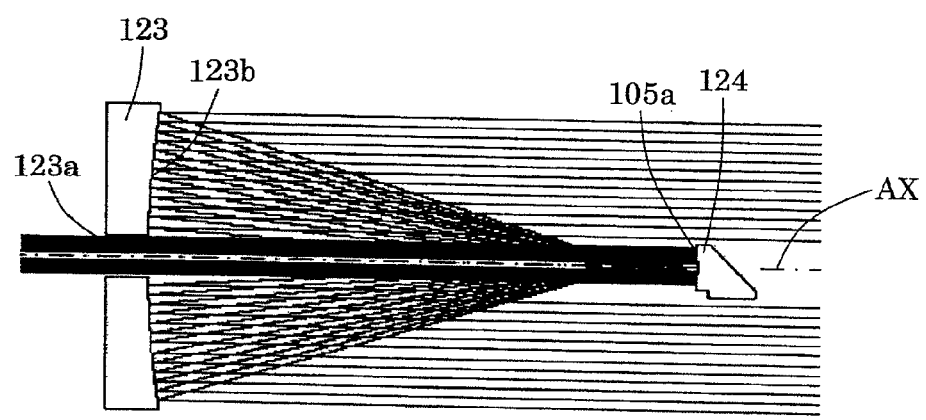
FIG. 12 is a drawing showing an exemplary operating state of a laser radar device to which the alignment device of the fourth embodiment is applied.

With reference to FIG. 12, when the laser radar device in the fourth embodiment is in an operating state, the laser light from the laser light source (not shown) has, for example, an annular cross section and is guided to the Gregorian optical system (123, 124). The laser light guided to the Gregorian optical system (123, 124) passes through the center through hole 123a of the primary mirror 123 and is incident in a parallel beam state to the secondary mirror 124.

The laser light incident to the secondary mirror 124 is successively reflected on the dichroic film 105a forming the front reflecting surface of the secondary mirror 124 and on the reflecting surface 123b of the primary mirror 123, and thereafter is sent, for example, upward in the parallel beam state into the sky. Scattered laser light from a target irradiated with the laser light is successively reflected on the reflecting surface 123b of the primary mirror 123 and on the dichroic film 105a of the secondary mirror 124, and passes through the center through hole 123a of the primary mirror 123 to reach a light receiving part (not shown).

The alignment device of the fourth embodiment, as in the case of the third embodiment, is able to perform the alignment between the primary mirror 123 and the secondary mirror 124 so as to lead the light spot formed on the detection surface of the photodetector 107, to the predetermined position, based on the positional deviation information between the primary mirror 123 and the secondary mirror 124 detected by the signal processor 108. Namely, the fourth embodiment also allows the position adjustment between the primary mirror 123 and the secondary mirror 124 in the Gregorian optical system of the laser radar device, without substantial occurrence of loss in quantity of light, in accordance with the simple configuration. The below will describe the fourth example which is a specific numerical example of the fourth embodiment.

Fourth Example

Table (10) below provides values of specifications of the Gregorian optical system in an operating state for a target at infinity of the laser radar device. In the Gregorian optical system of the fourth example, the diameter of the entrance pupil is 37.5 mm, the diameter of the center shielding of the used light 7.0 mm, and the beam enlargement magnification 8×.

TABLE (10)

| Surface No. | r | d | κ | |
|---|---|---|---|---|
| 1* | −125.0000 | −562.50 (d6) | −1 | (dichroic film 105a of secondary mirror 124) |
| 2* | 1000.0000 | ∞ (d7) | −1 | (reflecting surface 123b of primary mirror 123) |

Table (11) below provides values of specifications of the alignment optical system of the alignment device applied to the position adjustment of the Gregorian optical system in the operating state for the target at infinity. In the alignment optical system of the fourth example, the diameter of the entrance pupil is 37.5 mm, the diameter of the center shielding of the alignment light 18.75 mm, and the wavelength of the alignment light 632.8 nm.

TABLE (11)

| (Specifications of Optical Members) | | | | |
|---|---|---|---|---|
| Surface No. | r | d | κ | n |
| 1 | ∞ | 160.00 | | (beam splitter 102) |
| 2 | 357.3598 | 40.00 | | 1.457021 (refracting surface 104a of secondary mirror 124) |
| 3 | ∞ | 42.50 | | 1.457021 (reflecting surface 103a of secondary mirror 124) |
| 4* | 125.0000 | 562.50 (−d6) | −1 | (film 105a of secondary mirror 124) |
| 5* | −1000.0000 | −562.50 (d8) | −1 | (reflecting surface 123b of primary mirror 123) |
| 6* | 125.0000 | −42.50 | −1 | 1.457021 (film 105a of secondary mirror 124) |
| 7 | ∞ | −40.00 | | 1.457021 (reflecting surface 103a of primary mirror 124) |
| 8 | 357.3598 | −200.00 | | (refracting surface 104a |

TABLE (11)-continued (Specifications of Optical Members)

| Surface No. | r | d | κ | n |
|---|---|---|---|---|
| 9 | −86.7748 | (d9) −10.00 | | of secondary mirror 124) 1.457021 (condensing optical system 106) |
| 10 | 403.3691 | −150.00 (d10) | | |

Table (12) below provides values of the surface separations in the Gregorian optical system and the alignment optical system for the target at infinity, and the surface separations in the Gregorian optical system and the alignment optical system for a target at a finite distance (100 m). In Table (12), the surface separation d6 is a distance along the optical axis AX from the reflecting surface 123b of the primary mirror 123 to the dichroic film 105a of the secondary mirror 124, as shown in Table (10) and Table (11). The surface separation d7 is a distance from the reflecting surface 123b of the primary mirror 123 to the target at infinity, as shown in Table (10).

The surface separation d8 is a distance along the optical axis AX from the dichroic film 105a of the secondary mirror 124 to the reflecting surface 123b of the primary mirror 123, as shown in Table (11). The surface separation d9 is a distance along the optical axis AX from the back refracting surface 104a of the secondary mirror 124 to the entrance surface of the condensing optical system 106, as shown in Table (11). The surface separation d10 is a distance along the optical axis AX from the exit surface of the condensing optical system 106 to the detection surface of the photodetector 107, as shown in Table (11).

TABLE (12)

| Surface separation | target at infinity | target at finite distance |
|---|---|---|
| d6 | −562.50 | −565.08 |
| d7 | ∞ | 100000.00 |
| d8 | 562.50 | 565.08 |
| d9 | −200.00 | −200.51 |
| d10 | −150.00 | −149.49 |

With reference to Table (12), the Gregorian optical system in the laser radar device according to the fourth example can be focused on the target at the finite distance of 100 m from the target at infinity by moving the secondary mirror 124 by 2.58 mm to the right in FIG. 10 along the optical axis AX. At this time, the alignment optical system of the fourth example can be focused by moving the condensing optical system 106 by 0.51 mm down in FIG. 10 along the optical axis AX.

In the alignment devices according to the third and fourth embodiments, the dichroic film to reflect the used light in the optical system and to transmit the alignment light is formed on the front surface of the secondary mirror and the back refracting surface to refract the alignment light is formed on the back of the secondary mirror, for achieving the position adjustment between the primary mirror and the secondary mirror in the optical system having the primary mirror and the secondary mirror arranged so as to face each other along the optical axis. The surface shape of the back refracting surface is so determined, for example, that the alignment light incident in the parallel beam state to the back refracting surface is normally incident through the dichroic film to the reflecting surface of the primary mirror.

As a result, the device is able to detect the positional deviation between the primary mirror and the secondary mirror, based on the alignment light having entered the back refracting surface of the secondary mirror and having successively traveled via the dichroic film, the reflecting surface of the primary mirror, the dichroic film, and the back refracting surface, and to perform the position adjustment between the primary mirror and the secondary mirror, based on the positional deviation information between the primary mirror and the secondary mirror thus detected. Namely, the alignment devices and methods according to the third and fourth embodiments allow the position adjustment between the primary mirror and the secondary mirror in the optical system, without substantial occurrence of loss in quantity of light, in accordance with the simple configurations.

The above description concerned the applications of the alignment device for aligning the primary mirror with the secondary mirror in the Cassegrain optical system or the Gregorian optical system of the laser optical apparatus, for example, like the laser radar device. However, without having to be limited to this, the present invention is applicable to any alignment device for aligning a primary mirror with a secondary mirror in an optical system having the primary mirror and the secondary mirror arranged so as to face each other along the optical axis.

The invention is not limited to the forgoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments.

Further, components in different embodiments may be appropriately combined.

What is claimed is:

1. An alignment device for aligning a primary mirror with a secondary mirror in an optical system having the primary mirror and the secondary mirror arranged such that a front side of the secondary mirror faces a front side of the primary mirror along an optical axis, the alignment device comprising:
    a dichroic film formed on a surface on the front side of the secondary mirror and configured to reflect light used in the optical system and to transmit alignment light;
    a back optical surface formed on a back side of the secondary mirror and configured to reflect or refract the alignment light; and
    a detection system which detects a positional deviation between the primary mirror and the secondary mirror, based on the alignment light having traveled via the dichroic film, the back optical surface, and a reflecting surface of the primary mirror.

2. The alignment device according to claim 1, wherein the back optical surface is a back reflecting surface which is formed on the back side of the secondary mirror and which reflects the alignment light, and
    wherein the detection system detects the positional deviation between the primary mirror and the secondary mirror, based on the alignment light having entered the dichroic film of the secondary mirror and having been successively reflected on the back reflecting surface, the reflecting surface of the primary mirror, and the back reflecting surface.

3. The alignment device according to claim 1, wherein the back optical surface is a back refracting surface which is formed on the back side of the secondary mirror and which refracts the alignment light, and wherein the detection system detects the positional deviation between the primary mirror and the secondary mirror, based on the alignment light having entered the back refracting surface and having successively traveled via the dichroic film, the reflecting surface of the primary mirror, the dichroic film, and the back refracting surface.

4. The alignment device according to claim 2, wherein the detection system has a photodetector and a condensing optical system for condensing the alignment light on a detection surface of the photodetector.

5. The alignment device according to claim 2, wherein a surface shape of the back reflecting surface is so determined that the alignment light incident in a parallel beam state to the dichroic film is normally incident to the reflecting surface of the primary mirror.

6. The alignment device according to claim 3, which comprises a back reflecting member arranged on the back side of the secondary mirror and configured to reflect the alignment light, wherein the alignment light is reflected on a reflecting surface of the back reflecting member and thereafter is incident to the back refracting surface.

7. The alignment device according to claim 3, wherein the secondary mirror has an inside reflecting surface formed in an optical path between the dichroic film and the back refracting surface, and wherein the alignment light incident to the back refracting surface is reflected on the inside reflecting surface and thereafter is incident to the dichroic film.

8. The alignment device according to claim 3, wherein the detection system has a photodetector and a condensing optical system for condensing the alignment light on a detection surface of the photodetector.

9. The alignment device according to claim 3, wherein a surface shape of the back refracting surface is so determined that the alignment light incident in a parallel beam state to the back refracting surface is normally incident to the reflecting surface of the primary mirror.

10. The alignment device according to claim 5, wherein the surface shape of the back reflecting surface and a refractive index for the alignment light of an optical material forming a main body of the secondary mirror are so determined that the alignment light incident in the parallel beam state to the dichroic film is normally incident to the reflecting surface of the primary mirror.

11. The alignment device according to claim 9, wherein the surface shape of the back refracting surface and a refractive index for the alignment light of an optical material forming a main body of the secondary mirror are so determined that the alignment light incident in the parallel beam state to the back refracting surface is normally incident to the reflecting surface of the primary mirror.

12. An alignment method for an optical system having a primary mirror and a secondary mirror arranged such that a front side of the secondary mirror faces a front side of the primary mirror along an optical axis, the alignment method comprising aligning the primary minor with the secondary mirror, based on information of detected positional deviation between the primary mirror and the secondary mirror, the aligning being performed using an alignment device including:

a dichroic film formed on a surface on the front side of the secondary mirror and configured to reflect light used in the optical system and to transmit alignment light;

a back optical surface formed on a back side of the secondary mirror; and a detection system which detects the positional deviation between the primary mirror and the secondary mirror, based on the alignment light having traveled via the dichroic film, the back optical surface, and a reflecting surface of the primary minor, wherein the back optical surface is a back reflecting surface which is formed on the back side of the secondary mirror which reflects the alignment light, and wherein the detection system detects the positional deviation between the primary mirror and the secondary mirror, based on the alignment light having entered the dichroic film of the secondary mirror and having been successively reflected on the back reflecting surface, the reflecting surface of the primary minor, and the back reflecting surface.

13. An optical apparatus comprising:

an optical system having a primary mirror and a secondary mirror arranged such that a front side of the secondary mirror faces a front side of the primary mirror along an optical axis; and an alignment device for aligning the primary mirror with the secondary mirror, the alignment device including:

a dichroic film formed on a surface on the front side of the secondary mirror and configured to reflect light used in the optical system and to transmit alignment light;

a back optical surface formed on a back side of the secondary mirror; and a detection system which detects a positional deviation between the primary mirror and the secondary mirror, based on the alignment light having traveled via the dichroic film, the back optical surface, and a reflecting surface of the primary mirror, wherein the back optical surface is a back reflecting surface which is formed on the back side of the secondary mirror and which reflects the alignment light, and wherein the detection system detects the positional deviation between the primary mirror and the secondary mirror, based on the alignment light having entered the dichroic film of the secondary mirror and having been successively reflected on the back reflecting surface, the reflecting surface of the primary mirror, and the back reflecting surface.

14. An alignment method for an optical system having a primary mirror and a secondary mirror arranged such that a front side of the secondary mirror faces a front side of the primary mirror along an optical axis, the alignment method comprising aligning the primary mirror with the secondary mirror, based on information of detected positional deviation between the primary mirror and the secondary mirror the aligning being performed using an alignment device including:

a dichroic film formed on a surface on the front side of the secondary mirror and configured to reflect light used in the optical system and to transmit alignment light;

a back optical surface formed on a back side of the secondary mirror; and a detection system which detects the positional deviation between the primary mirror and the secondary mirror, based on the alignment light having traveled via the dichroic film, the back optical surface, and a reflecting surface of the primary mirror, wherein the back optical surface is a back refracting surface which is formed on the back side of the secondary mirror and which refracts the alignment light, and wherein the detection system detects the positional deviation between the primary mirror and the secondary mirror, based on the alignment light having entered the back refracting surface and having successively traveled via the dichroic film, the reflecting surface of the primary mirror, the dichroic film, and the back refracting surface.

15. An optical apparatus comprising:

an optical system having a primary mirror and a secondary mirror arranged such that a front side of the secondary mirror faces a front side of the primary mirror along an optical axis;

an alignment device for aligning the primary mirror with the secondary mirror, the alignment device including:

a dichroic film formed on a surface on the front side of the secondary mirror and configured to reflect light used in the optical system and to transmit alignment light;

a back optical surface formed on a back side of the secondary mirror; and a detection system which detects a positional deviation between the primary mirror and the secondary mirror, based on the alignment light having traveled via the dichroic film, the back optical surface, and a reflecting surface of the primary mirror, wherein the back optical surface is a back refracting surface which is formed on the back side of the secondary mirror and which refracts the alignment light, and wherein the detection system detects the positional deviation between the primary mirror and the secondary mirror, based on the alignment light having entered the back refracting surface and having successively traveled via the dichroic film, the reflecting surface of the primary mirror, the dichroic film, and the back refracting surface.

* * * * *